United States Patent
Yamakawa (10) Patent No.: US 11,506,412 B2
(45) Date of Patent: Nov. 22, 2022

(54) AIR CONDITIONER

(71) Applicant: Mitsubishi Electric Corporation, Tokyo (JP)

(72) Inventor: Hidetoshi Yamakawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 294 days.

(21) Appl. No.: 16/956,032

(22) PCT Filed: Jan. 11, 2018

(86) PCT No.: PCT/JP2018/000405
§ 371 (c)(1),
(2) Date: Jun. 19, 2020

(87) PCT Pub. No.: WO2019/138481
PCT Pub. Date: Jul. 18, 2019

(65) Prior Publication Data
US 2020/0408430 A1    Dec. 31, 2020

(51) Int. Cl.
*F24F 11/46*    (2018.01)
*F24F 11/88*    (2018.01)
(Continued)

(52) U.S. Cl.
CPC .............. *F24F 11/46* (2018.01); *F24F 11/88* (2018.01); *H02M 5/4585* (2013.01); *H02P 27/06* (2013.01)

(58) Field of Classification Search
CPC ........ F24F 11/46; F24F 11/88; H02M 5/4585; H02P 27/06
See application file for complete search history.

(56) References Cited

U.S. PATENT DOCUMENTS 6,092,377 A * 7/2000 Tso .................. F25B 39/04
62/262
10,742,023 B2   8/2020 Sakurai et al.
(Continued)

FOREIGN PATENT DOCUMENTS

EP   2 241 831 A1   10/2010
EP   3 208 551 A1    8/2017
(Continued)

OTHER PUBLICATIONS

Translation of JP2011099597 has been attached.*
(Continued)

*Primary Examiner* — Zoheb S Imtiaz
(74) *Attorney, Agent, or Firm* — Posz Law Group, PLC (57) ABSTRACT

An air conditioning apparatus including an outdoor unit and an indoor unit comprises a converter main circuit that rectifies and smooths an AC power supply, and allows a DC voltage to be generated across a main circuit capacitor, an inverter main circuit that converts the DC voltage generated by the main circuit capacitor into an AC voltage, a compressor motor driven by the inverter main circuit, an outdoor fan, a fan motor that rotationally drives the outdoor fan, and a microcomputer that controls the outdoor unit. When the fan motor rotates due to outside wind hitting the outdoor fan and enters a power generating state during a standby power saving mode of the outdoor unit, the microcomputer prevents the outdoor unit from shifting to a non-operating state from the standby power saving mode.

9 Claims, 8 Drawing Sheets

(51) Int. Cl.
  *H02M 5/458* (2006.01)
  *H02P 27/06* (2006.01)

(56) References Cited

U.S. PATENT DOCUMENTS

| | | | |
|---|---|---|---|
| 2015/0028780 A1* | 1/2015 | Hatakeyama | F24F 11/77 318/400.1 |
| 2017/0063248 A1* | 3/2017 | Lee | F24F 11/62 |
| 2018/0026558 A1* | 1/2018 | Katayama | H02P 29/0241 318/400.09 |
| 2018/0278049 A1 | 9/2018 | Sakurai et al. | |

FOREIGN PATENT DOCUMENTS

| | | |
|---|---|---|
| JP | H05-130794 A | 5/1993 |
| JP | 2001-263767 A | 9/2001 |
| JP | 2003-274694 A | 9/2003 |
| JP | 2004-125209 A | 4/2004 |
| JP | 2009-055781 A | 3/2009 |
| JP | 2010-243051 A | 10/2010 |
| JP | 2011099597 * | 5/2011 |
| JP | 2014-027796 A | 2/2014 |
| JP | 2014-057497 A | 3/2014 |
| JP | 2015-132407 A | 7/2015 |
| WO | 2017/119084 A1 | 7/2017 |

OTHER PUBLICATIONS

Extended European search report dated Dec. 1, 2020 issued in corresponding EP application No. 18899975.9.
International Search Report of the International Searching Authority dated Apr. 17, 2018 for the corresponding international application No. PCT/JP2018/000405 (and English translation).
Chinese Office Action dated Feb. 25, 2021, issued in corresponding Chinese Patent Application No. 201880085522.2 (and English Machine Translation).
Japanese Office Action dated Mar. 2, 2021, issued in corresponding Japanese Patent Application No. 2019-565119 (and English Machine Translation).
Australian Office Action dated Feb. 5, 2021, issued in corresponding Australian Patent Application No. 2018402082.

* cited by examiner

FIG.1

《STANDBY POWER SAVING MODE》

FIG.2

《NON-OPERATING STATE》

AIR CONDITIONER

CROSS REFERENCE TO RELATED APPLICATION

This application is a U.S. national stage application of PCT/JP2018/000405 filed on Jan. 11, 2018, the contents of which are incorporated herein by reference.

FIELD

The present invention relates to an air conditioner including an inverter for supplying power to a fan motor that rotationally drives a fan of an outdoor unit, and in particular to control of the air conditioner when a regenerative voltage is generated in the fan motor by rotation of the fan receiving outside wind.

BACKGROUND

Some conventional air conditioners have introduced a standby power saving mode that cuts off power supply to an outdoor unit during standby in order to reduce power consumption of the outdoor unit during standby. Such an air conditioner is provided with a relay between a power line from an eternal power supply and a rectifier circuit mounted inside the outdoor unit, and the relay is opened during the standby power saving mode to thereby stop power supply to an electric circuit in the outdoor unit (see Patent Literature 1).

When a fan of the outdoor unit in the standby power saving mode rotates due to outside wind, a fan motor can enter a power generating state as a result of the rotation of the fan. A regenerative current generated by the rotation of the fan motor may charge a main circuit capacitor of the outdoor unit, thereby starting the outdoor unit despite the standby power saving mode of the outdoor unit. Upon starting, the outdoor unit shifts to a normal non-operating state, which results in standby power in the outdoor unit. The start of the outdoor unit due to such an operation sequence different from a normal starting method is not preferable from the standpoint of standby-power reduction. Also, a regenerative voltage of the fan motor caused by the outside wind may lead to an overvoltage of the main circuit capacitor and thus failure of an electric component such as a semiconductor element used in the outdoor unit.

One known method addresses such start of the outdoor unit caused by the outside wind. According to such a known method, when the outdoor unit starts with the main circuit capacitor charged in the absence of an operation command from an indoor unit, a charge level of the main circuit capacitor is monitored. If the voltage of the main circuit capacitor exceeds a predetermined voltage level, a compressor built in the outdoor unit is driven to thereby lower a DC voltage level of the main circuit capacitor (see Patent Literature 2). According to another known method, a compressor inverter performs constraint energisation in driving the compressor (see Patent Literature 3).

According to a yet another method, when the voltage of the main circuit capacitor exceeds a predetermined voltage level due to the regenerative voltage of the fan motor caused by the outside wind, a switching pattern of an inverter circuit, which drives the fan motor, is changed to allow a short-circuit current to flow to the winding of the fan motor, thereby reducing or preventing an increase in voltage of the main circuit capacitor due to the regenerative voltage (see Patent Literature 4).

CITATION LIST

Patent Literature

Patent Literature 1: Japanese Patent Application Laid-open No. 2010-243051
Patent Literature 2: Japanese Patent Application Laid-open No. 2001-263767
Patent Literature 3: Japanese Patent Application Laid-open No. 2014-57497
Patent Literature 4: Japanese Patent Application Laid-open No. 2009-55781

SUMMARY

Technical Problem

For the air conditioner having the standby power saving mode as disclosed in Patent Literature 1, the outdoor unit, which started due to the regenerative voltage caused by the outside wind during operation of the outdoor unit in the standby power saving mode, shifts to the non-operating state as in the normal start of the outdoor unit. As a result, unfortunately, the outdoor unit becomes out of the standby power saving state.

The methods disclosed in Patent Literatures 2, 3, and 4 provide means for protecting an electric component including the main circuit capacitor against the excessive regenerative voltage generated by the rotation of the fan motor of the outdoor unit due to the outside wind. Unfortunately, those methods do not take account of reducing standby power when the outdoor unit starts due to the regenerative voltage caused by the outside wind.

In the case of the means for protecting the electric component as disclosed in Patent Literature 2, the compressor is driven in an attempt to consume the regenerative energy. Such a drive of the compressor takes place with abnormally high voltage applied to the main circuit capacitor. As a result, unfortunately, the distortion of the current supplied from the inverter to the compressor increases. This would lead to control failure in driving the compressor, and hence failure to drive the compressor.

When the air conditioner is used in a warm region, the temperature of the compressor does not drop easily. For this reason, some air conditioner used in such a warm region does not have the function of constraint energization. Many air conditioners having a function of heating compressors with heaters do not have the function of constraint energization. For this reason, the control method relying on the constraint energization function as described in Patent Literature 3 is not applicable to some model of the air conditioner and thus lacks versatility.

Some fan motor used in an air conditioner has the inverter and the motor integrated together. For such an integrated structure of the fan motor, the switching pattern inside the inverter cannot change dynamically in many cases. The control method disclosed in Patent Literature 4, which reduces or prevents an increase in voltage of the main circuit capacitor by changing the switching pattern of the inverter circuit, is not applicable to that integrated structure.

The present invention has been made in order to solve the above problems, and an object of the present invention is to provide an air conditioner having a standby power saving mode and capable of reducing power consumption of an outdoor unit even when the outdoor unit, which starts due to a regenerative voltage generated by a fan motor rotated by outside wind during the standby power saving mode, enters a power generating state.

Solution to Problem

An air conditioner of the present invention includes an outdoor unit and an indoor unit, and comprises: a converter main circuit to rectify and smooth an AC voltage, and allow a DC voltage to be generated across a main circuit capacitor; an inverter main circuit to convert the DC voltage generated by the main circuit capacitor into an AC voltage; a compressor motor to be driven by the inverter main circuit; an outdoor fan; a fan motor to rotationally drive the outdoor fan; and a controller to control the outdoor unit, wherein when the fan motor rotates due to outside wind hitting the outdoor fan and enters a power generating state during a standby power saving mode of the outdoor unit, the controller prevents the outdoor unit from shifting to a non-operating state from the standby power saving mode.

Advantageous Effects of Invention

The air conditioner of the present invention can reduce power consumption due to unnecessary start of the outdoor unit because the air conditioner prevents the outdoor unit from shifting to the non-operating state from the standby power saving mode when the outdoor unit starts due to the fan motor being rotated by the outside wind and entering the power generating state during the standby power saving mode of the outdoor unit.

DESCRIPTION OF EMBODIMENTS

First Embodiment

Figure 1:
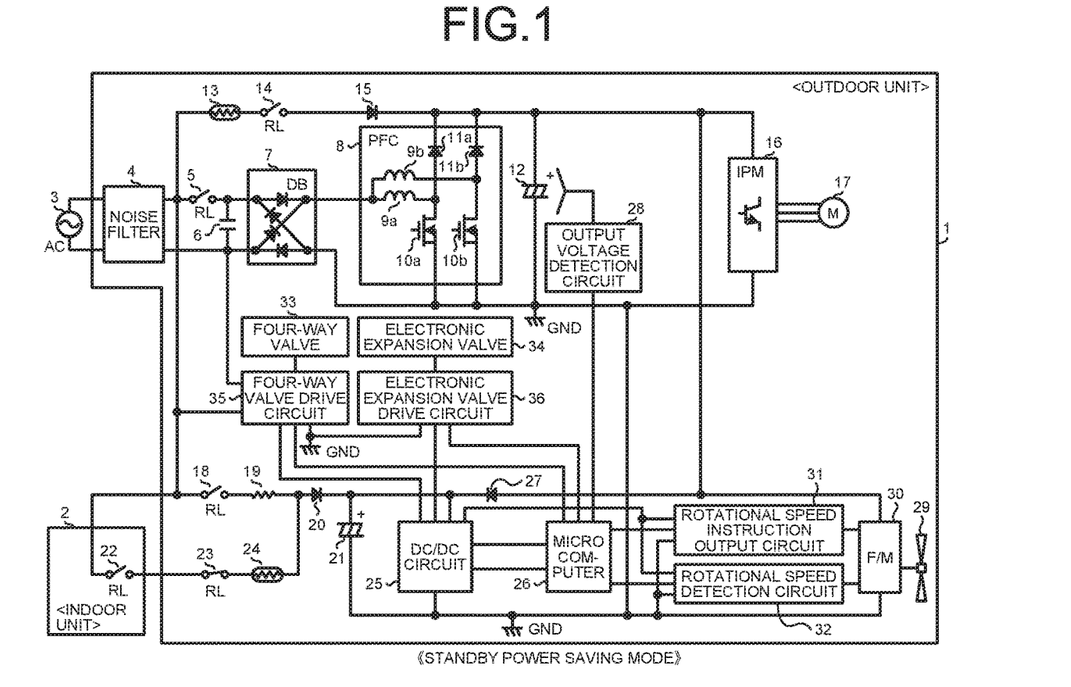
FIG. 1 is a diagram illustrating a configuration (standby power saving mode) of an air conditioner according to a first embodiment.
Figure 2:
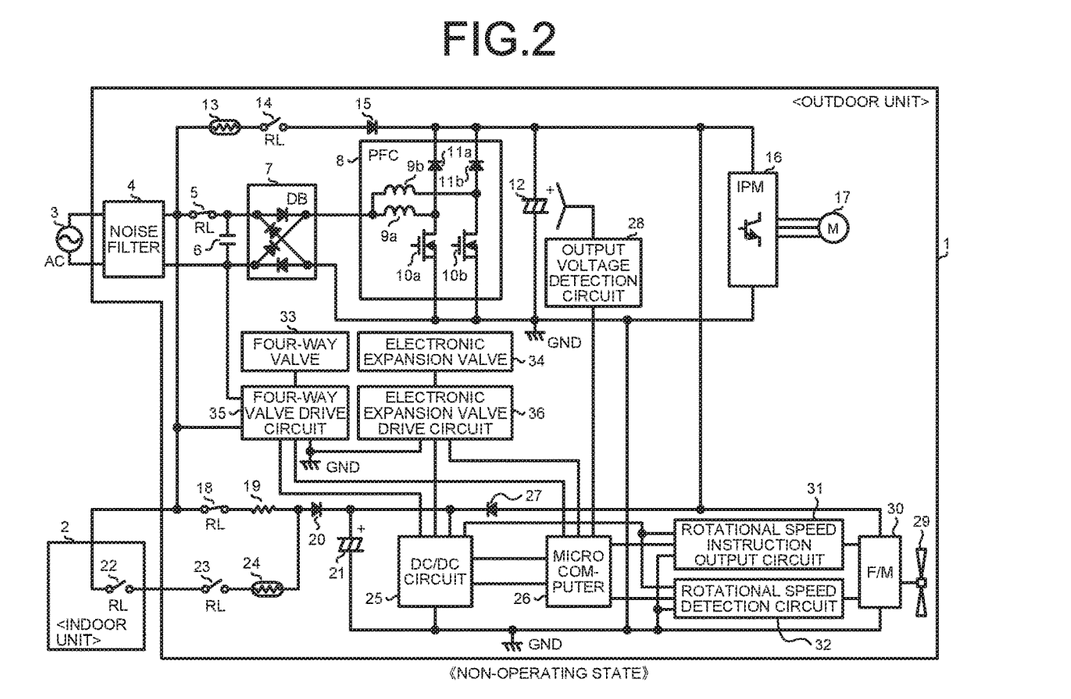
FIG. 2 is a diagram illustrating a configuration (non-operating state) of the air conditioner according to the first embodiment.
Figure 3:
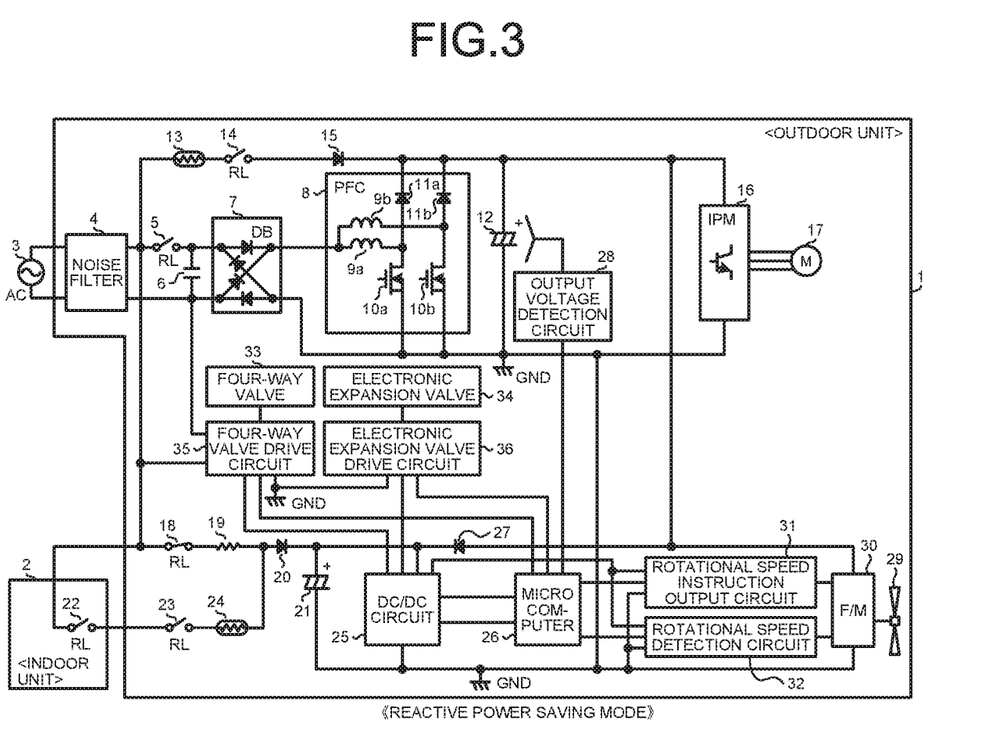
FIG. 3 is a diagram illustrating a configuration (reactive power saving mode) of the air conditioner according to the first embodiment.

The configuration and operation of an air conditioner according to a first embodiment will be described with reference to the drawings. FIGS. 1 to 3 are each a diagram illustrating the configuration of the air conditioner and illustrate circuit configurations in a standby power saving mode (FIG. 1), a non-operating state (FIG. 2), and a reactive power saving mode (FIG. 3). Note that the description of each operation mode will be described later.

First, the configuration of the air conditioner will be described with reference to FIG. 1. The air conditioner includes an outdoor unit 1 and an indoor unit 2. The outdoor unit 1 and the indoor unit 2, which are connected by refrigerant piping (not shown), form a refrigeration cycle. FIG. 1 illustrates only components necessary for describing the operation of the present invention and omits the illustration of many items forming the refrigeration cycle, such as a heat exchanger and the refrigerant piping, which are typically included in an air conditioner. Moreover, since a main operation is related to the configuration of the outdoor unit 1, the configuration of the indoor unit 2 is simplified in the illustration.

A power line from an AC power supply 3 is connected to a power-supply-side terminal of a noise filter 4 of the outdoor unit 1, and the outdoor unit 1 operates using AC power from the AC power supply 3. Note that the AC power supply 3 is also connected to the indoor unit 2 through a load-side terminal of the noise filter 4, and the indoor unit. 2 also operates using the AC power from the AC power supply 3.

A relay (RL) 5, which is first switching means, has one end connected to one end of the load terminal of the noise filter 4. A capacitor 6 for noise reduction is connected between the other end of the relay 5 and the other end of the load terminal of the noise filter 4. The relay 5 is a normally open relay. Power-supply-side terminals of a full-wave rectifier circuit (DB) 7, which is a first rectifier circuit, are connected to opposite ends of the capacitor 6. The full-wave rectifier circuit 7 is formed by a diode bridge. The full-wave rectifier circuit 7 rectifies an AC voltage supplied from the AC power supply 3 and outputs a DC voltage. Since the relay 5 is provided on an AC voltage path between the AC power supply 3 and the full-wave rectifier circuit 7, the supply of the AC voltage from the AC power supply 3 to the full-wave rectifier circuit 7 can be cut off by opening the relay 5.

A load-side terminal of the full-wave rectifier circuit 7 is connected to a converter main circuit 8. The converter main circuit 8 converts the DC voltage output from the full-wave rectifier circuit 7, and outputs the converted DC voltage. In the description herein, the converter main circuit 8 is described herein on the assumption that the converter main circuit 8 is a power factor correction (PFC) converter. Note that the converter main circuit 8 is not limited to such a converter, and another converter main circuit may be configured using a known technique.

The converter main circuit 8, which is the power factor correction (PFC) converter, includes reactors 9a and 9b, switching elements 10a and 10b such as MOSFETs (field effect transistors), and backflow prevention diodes 11a and 11b. Then, a converter control microcomputer (not shown) is used to control the switching elements 10a and 10b such that a phase difference occurs between the currents flowing through the reactors 9a and 9b. As a result, the AC voltage is rectified, smoothed and boosted into a converter output. A main circuit capacitor 12 is provided on the output side of the converter main circuit 8, so that the converter output voltage charges the main circuit capacitor 12, thereby generating a smoothed DC voltage between terminals of the main circuit capacitor 12. An electrolytic capacitor is suitable as the main circuit capacitor 12. Note that a known control method can be used for details of control of the power factor correction converter.

An AC-power-supply-side terminal of the relay 5 is connected to one end of a positive temperature coefficient (PTC) thermistor 13. A relay (RE) 14, which is second switching means, has one end connected to the other end of the PTC thermistor 13. The relay 14 is a normally open relay. The relay 14 has the other end connected to an anode of a backflow prevention diode 15, and a cathode of the backflow prevention diode 15 is connected to a positive terminal of the main circuit capacitor 12. The PTC thermistor 13, the relay 14, and the backflow prevention diode 15, which are connected in series to one another in the above discussed manner between the AC power supply terminal of the relay 5 and the positive terminal of the main circuit capacitor 12, define a bypass charging path to the main circuit capacitor 12. Providing the bypass charging path with the PTC thermistor 13 can prevent an inrush current at the time of charging the main circuit capacitor 12. Note that a normal resistance element may be used instead of the PTC thermistor 13 depending on the device characteristics of circuit components such as the main circuit capacitor 12. The diode 15 is desirably an element having a higher current tolerance than the diodes in the full-wave rectifier circuit 7 and the converter main circuit 8.

An inverter main circuit. 16 is connected between the terminals of the main circuit capacitor 12, and is connected to a compressor motor 17 mounted in the outdoor unit 1. The motor 17 is, for example, a brushless DC motor. The inverter main circuit 16 uses an inverter control microcomputer (not shown) to drive switching elements in the inverter main circuit 16 on and off to convert the DC voltage generated between the terminals of the main circuit capacitor 12 into an AC voltage, thereby driving the motor 17 to rotate. Note that the inverter main circuit 16 may be formed of an intelligent power module (IPM).

A relay (RL) 18, which is third switching means, has one end connected to the AC-power-supply-side terminal of the relay 5. The relay (RI) 18 has the other end connected to one end of a resistance element 19. The relay 18 is a normally open relay. The other end of the resistance element 19 is connected to an anode of a diode 20, and a cathode of the diode 20 is connected to a positive terminal of a smoothing capacitor 21. The diode 20 and the smoothing capacitor 21 define a second rectifier circuit for rectifying the AC voltage of the AC power supply 3 and outputting a DC voltage. An electrolytic capacitor is suitable as the smoothing capacitor 21. Moreover, the capacity of the smoothing capacitor 21 may be smaller than that of the main circuit capacitor 12 because the voltage of the smoothing capacitor 21 is used to generate power supply for a light electrical system of the outdoor unit 1, as described later.

The AC-power-supply-side terminal of the relay 5 is also connected to one end of an outdoor start relay (RE) 22 in the indoor unit 2. A relay (RL) 23, which is fourth switching means, has one end connected to the other end of the outdoor start relay 22. The relay 23 is a normally closed relay. The other end of the relay 23 is connected to one end of the other PTC thermistor 24, and the other end of the PTC thermistor 24 is connected to the anode of the diode 20.

A DC/DC converter circuit 25 is connected in parallel to the smoothing capacitor 21 and receives an input of a voltage between the terminals of the smoothing capacitor 21 to generate various DC voltages used by circuit elements in the outdoor unit. 1 such as a microcomputer 26. The microcomputer 26 operates using the output voltage of the DC/DC converter circuit 25 as a power supply. The microcomputer 26, which is a microcomputer having control over the entire outdoor unit 1, is a controller of the outdoor unit 1. The microcomputer 26 needs to be operating in order for the outdoor unit 1 to start and operate. The microcomputer 26 controls opening and closing of the relays 5, 14, 18, and 23.

The voltage between the terminals of the main circuit capacitor 12 is also input to the DC/DC converter circuit 25 via a diode 27. The DC/DC converter circuit 25 has an input voltage range that can support both the voltage between the terminals of the main circuit capacitor 12 and the voltage between the terminals of the smoothing capacitor 21. The diode 27 also has a role of blocking a direct current from the smoothing capacitor 21 toward the main circuit capacitor 12. Moreover, an output voltage detection circuit 28 detects the voltage between the terminals of the main circuit capacitor 12 and outputs the detected voltage value to the microcomputer 26 as the converter output voltage.

The outdoor unit 1 includes an outdoor fan 29, which is rotated by a fan motor 30 to allow air to flow to an outdoor heat exchanger (not shown). The outdoor fan 29 operates using the voltage between the terminals of the main circuit capacitor 12 as a power supply. Note that the fan motor 30 and the outdoor fan 29 may be physically integrated or may be separated.

On the basis of an instruction from the microcomputer 26, a rotational speed instruction output circuit 31 outputs, to the fan motor 30, a signal for controlling the rotational speed of the outdoor fan 29. A rotational speed detection circuit 32 detects the rotational speed of the fan motor 30 by counting the rotational speed pulses output from the fan motor 30, and outputs the detected rotational speed to the microcomputer 26. The rotational speed instruction output circuit 31 and the rotational speed detection circuit 32 operate using the output voltage of the DC/DC converter circuit 25 as a power supply.

A four-way valve 33 and an electronic expansion valve 34, which define the refrigeration cycle, are driven and controlled by a four-way valve drive circuit 35 and an electronic expansion valve drive circuit 36, respectively, on the basis of instructions from the microcomputer 26. The four-way valve drive circuit 35 operates using the voltage between the load terminals of the noise filter 4 as a power supply. The electronic expansion valve 34 operates using the output voltage of the DC/DC converter circuit 25 as a power supply.

Figure 4:
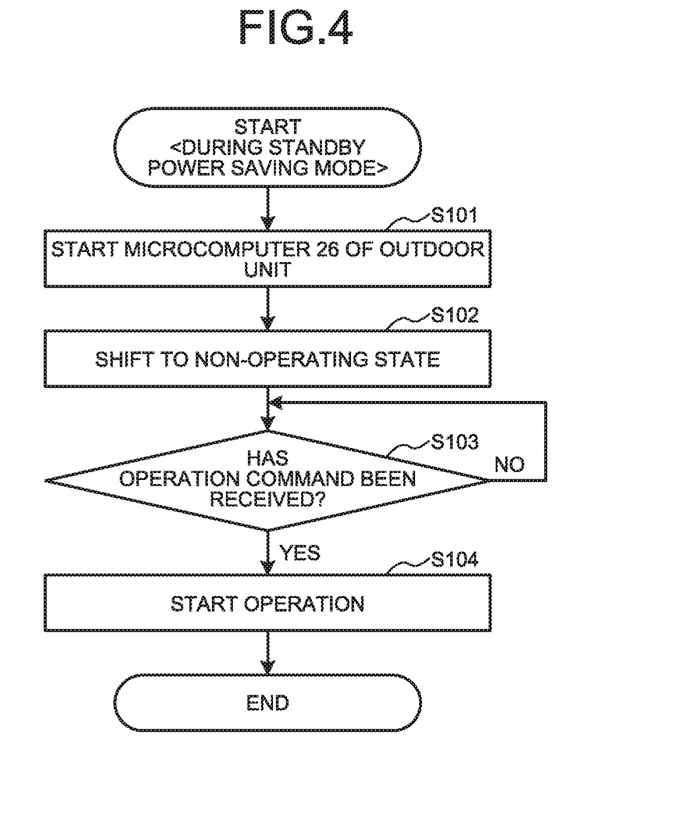
FIG. 4 an operational flow chart of the air conditioner according to the first embodiment at the time of normal start.

Next, a start sequence for starting the outdoor unit 1 in the standby power saving mode will be described with reference to an operational flow chart of FIG. 4. FIG. 1 illustrates the circuit configuration of the air conditioner when the outdoor unit 1 is in the standby power saving mode. As described later, the relays 5, 14, 18, and 23 of the outdoor unit 1 do not receive power supply from the AC power supply 3 in the standby power saving mode. The relays 5, 14, and 18 of the outdoor unit 1 are all normally open relays, and the relay 23 of the outdoor unit 1 is a normally closed relay. Thus, in the standby power saving mode, the relays 5, 14, and 18 of the outdoor unit 1 are open, and the relay 23 of the outdoor unit closed. Moreover, the outdoor start relay 22 of the indoor unit 2 is open. Accordingly, the indoor unit 2 is in operation using the AC power from the AC power supply 3, whereas the outdoor unit 1 does not start as power is not supplied to each circuit element of the outdoor unit 1 on the load side relative to the noise filter 4. Therefore, when the outdoor unit 1 in the standby power saving mode, power consumption in the outdoor unit 1 can be reduced significantly.

For the outdoor unit. 1 to start, the outdoor start relay 22 is closed first. This relay control is performed by an indoor controller (not shown) inside the indoor unit. 2 on the basis of a start signal from a remote control (not shown). When the outdoor start relay 22 is closed, the smoothing capacitor 21 is charged by the power of the AC power supply 3 through the path defined by the outdoor start relay 22, the relay 23, the PTC thermistor 24, and the diode 20. The DC/DC converter circuit 25 generates and outputs a voltage for the microcomputer 26 on the basis of the voltage between the terminals of the smoothing capacitor 21. The microcomputer 26 starts using the output voltage of the DC/DC converter circuit 25 as a power supply (step S101). After the start of the microcomputer 26, the microcomputer 26 controls the relay 18, such that the relay 18 is closed. As a result of the closing of the relay 18, the smoothing capacitor 21 is charged by the power of the AC power supply 3 also through the path defined by the relay 18, the resistance element 19, and the diode 20.

After that, the outdoor start relay 22 is opened by the indoor controller of the indoor unit 2. The relay 23 is opened by the control of the microcomputer 26. As a result, the smoothing capacitor 21 is charged only through the path including the relay 18. Note that the indoor controller of the indoor unit 2 may open the outdoor start relay 22 after a lapse of a predetermined time since the outdoor start relay 22 is closed, or after the indoor controller receives a signal indicating the start of the microcomputer 26 from the microcomputer 26 via a communication line (not shown) between the outdoor unit 1 and the indoor unit 2.

Next, the relay 14 is controlled by the microcomputer 26 such that the relay 14 is closed. As a result, the main circuit capacitor 12 is charged by the power of the AC power supply 3 through a path defined by the PTC thermistor 13, the relay 14, and the backflow prevention diode 15. The microcomputer 26 monitors the voltage between the terminals of the main circuit capacitor 12 detected by the output voltage detection circuit 28 and, after confirming that the voltage between the terminals has reached a predetermined value or higher, closes the relay 5 and subsequently opens the relay 14. After the relay 14 is opened, the main circuit capacitor 12 is charged from the AC power supply 3 only through a path defined by the relay 5, the full-wave rectifier circuit 7, and the converter main circuit 8.

As described above, closing the outdoor start relay 22 in the indoor unit 2 allows supply of power to the microcomputer 26 of the outdoor unit 1, such that the microcomputer 26 executes an initialization sequence including relay opening/closing control, thereby shifting the outdoor unit 1 from the standby power saving mode to the non-operating state (step S102). FIG. 2 illustrates the circuit configuration of the air conditioner when the outdoor unit 1 is in the non-operating state. After shifting to the non-operating state, the outdoor unit 1 checks whether an operation command for an air conditioning operation such as heating, cooling, or fan operation has been received from the indoor unit. 2, using the communication line (not shown) connected between the outdoor unit 1 and the indoor unit 2 (step S103). Upon receiving the operation command for the air conditioning operation, the outdoor unit 1 starts the air conditioning operation according to the operation command (step S104). Note that the circuit configuration of the air conditioner during the air conditioning operation is the same as that of FIG. 2.

Figure 5:
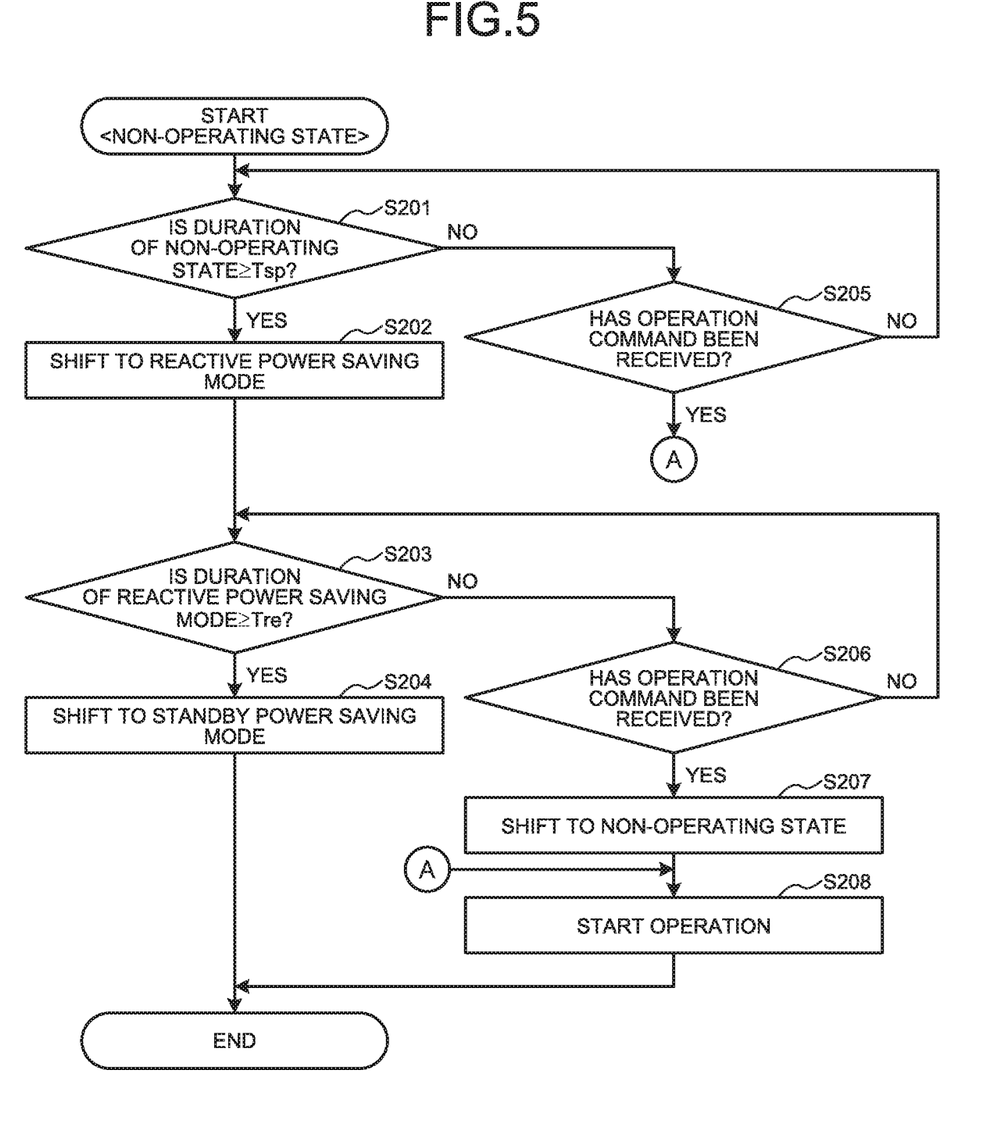
FIG. 5 is an operational flow chart or the air conditioner according to the first embodiment in the non-operating state.

Next, an operation sequence when the outdoor unit 1 shifts from the non-operating state (FIG. 2) to the standby power saving mode (FIG. 1) will be described with reference to an operational flow chart of FIG. 5.

Assume that the air conditioner is in the non-operating state of not performing an air conditioning operation such as heating, cooling, or fan operation. Although air conditioning operation is not performed in the non-operating state, both the indoor unit 2 and the outdoor unit 1 receive power supply from the AC power supply 3, and the microcomputer 26 of the outdoor unit 1 is operated normally.

The microcomputer 26 measures the duration of the non-operating state starting from the time when the outdoor unit 1 stops the air conditioning operation and enters the non-operating state. It is then determined whether or not a measured value of the duration is longer than or equal to a preset threshold time (Tsp). When the duration of the non-operating state is longer than or equal to the threshold time (Tsp) (Yes in step S201), the relay 5 is opened to thereby allow the outdoor unit to shift to the reactive power saving mode. FIG. 3 illustrates the configuration of the air conditioner in the reactive power saving mode. The reactive power saving mode, which is an operation mode provided by the opening of the relay 5, reduces the reactive power in the outdoor unit 1 by reducing the reactive current flowing through the capacitor 6.

When the duration of the non-operating state has not reached the threshold time (Tsp) (No in step S201), the microcomputer 26 checks whether an operation command for heating, cooling, or fan operation has been received from the indoor unit 2 (step S205). When the operation command has not been received (No in step S205), the microcomputer 26 continues to measure the duration of the non-operating state. When the operation command has been received (Yes in step S205), the air conditioning operation is performed in accordance with the content of the command (step S208).

After the outdoor unit shifts to the reactive power saving mode in step S202, the microcomputer 26 measures the duration of the reactive power saving mode starting from the time when the outdoor unit 1 shifts to the reactive power saving mode. It is then determined whether or not a measured value of the duration is longer than or equal to a preset threshold time (Tre). When the duration of the reactive power saving mode is longer than or equal to the threshold time (Tre) (Yes in step S203), the relay 18 is opened and the relay 23 is closed, thereby allowing the outdoor unit to shift to the standby power saving mode (step S204). Since the outdoor start relay 22 of the indoor unit 2 remains open throughout the non-operating state and the reactive power saving mode, the smoothing capacitor 21 cannot be charged with the power of the AC power supply 3 via the diode 20 as the relay 18 opened. For this reason, when the electric charge stored in the smoothing capacitor 21 and the main circuit capacitor 12 is consumed, the DC/DC converter circuit 25 stops the voltage output, such that the microcomputer 26 and the like stop operating, thereby reducing the power consumption of the entire outdoor unit 1.

When the duration of the reactive power saving mode has not reached the threshold time (Tre) (No in step S203), the microcomputer 26 checks whether an operation command for heating, cooling, or fan operation has been received from the indoor unit 2 (step S206). When the operation command has not been received (No in step S206), the microcomputer 26 continues to measure the duration of the non-operating state.

When the operation command has been received (Yes in step 3206), the microcomputer 26 checks the voltage between the terminals of the main circuit capacitor 12 detected by the output voltage detection circuit 28. When the voltage between these terminals is higher than or equal to a predetermined value, the relay 5 is closed to thereby allow the outdoor unit shift to the non-operating state (FIG. 2). When the voltage between these terminals is lower than a predetermined value, the relay 14 is closed. As a result, the main circuit capacitor 12 is charged by the power of the AC power supply 3 through a path defined by the PTC thermistor 13, the relay 14, and the backflow prevention diode 15. The microcomputer 26 monitors the voltage between the terminals of the main circuit capacitor 12 and, after confirming that the voltage between the terminals has reached a predetermined value or higher, closes the relay 5 and subsequently opens the relay 14. After the relay 14 is opened, the main circuit capacitor 12 is charged from the AC power supply 3 only through the path defined by the relay 5, the full-wave rectifier circuit. 7, and the converter main circuit 8, such that the shift to the non-operating state (FIG. 2) is completed. After that, the air conditioning operation is performed in accordance with the content of the operation command. (step S208).

Here, the circuit configuration of the air conditioner in each operation mode (operating state) is summarized as follows. In the non-operating state and the operating state, the relay 5 and the relay 18 remain closed. Therefore, the power from the AC power supply 3 is supplied to each electronic component in the outdoor unit 1.

In the reactive power saving mode, the relay 18 is closed but the relay 5 remains open. The opening of the relay 5 can cut off the reactive current through the capacitor 6 while cutting off the power supply to the main circuits implementing the power conversion function, such as the converter main circuit 8 and the inverter main circuit 16. Moreover, since the relay 18 is closed, the power supply to the microcomputer 26 implementing the control function is maintained.

In the standby power saving mode, the relays 5, 14, and 18 all remain open, such that no power is supplied to the electronic components implementing the power conversion function in the outdoor unit 1. As a result most of the power consumption in the air conditioner in the standby power saving mode occurs in the indoor unit 2, thereby reducing the standby power of the air conditioner as a whole significantly.

Next, a description will be made as to an operation in a case where the outdoor fan 29 of the outdoor unit 2 is rotated by receiving outside wind when the air conditioner is in the standby power saving mode (FIG. 1). When the outdoor fan 29 is rotated by the outside wind, the fan motor 30 is rotated, and an electromotive force is generated in a coil (not shown) of the fan motor 30. A regenerative current due to the electromotive force flows through the main circuit capacitor 12, thereby charging the main circuit capacitor 12. As the main circuit capacitor 12 is charged, the voltage between the terminals of the main circuit capacitor 12 increases, such that when the voltage between the terminals of the main circuit capacitor 12 reaches a voltage level necessary for the operation of the DC/DC converter circuit 25, the DC/DC converter circuit 25 starts operating. The normal operation of the DC/DC converter circuit 25 starts the microcomputer 26 that operates using the output voltage of the DC/DC converter circuit 25 as a power supply.

Here, in order to facilitate understanding of the significance of the present invention, conventional control in a case where the present invention is not applied will be briefly described. When the microcomputer 26 starts with the electromotive force due to the outside wind, the above initialization sequence (FIG. 4) is executed to thereby shift the outdoor unit 1 from the standby power saving mode to the non-operating state. Such a shift to the non-operating state is different from the normal start of the outdoor unit 1 performed by closing the outdoor start relay 22, and thus is an unintended start of the outdoor unit.

Once having started and shifted to the non-operating state, the outdoor unit 1 needs to go through the above sequence (FIG. 5) in order to return to the standby power saving mode again. This means that the outdoor unit 1 does not enter the standby power saving mode until after a predetermined time (Tsp+Tre) elapses at the earliest. As a result, the power consumption in the outdoor unit 1 increases until the outdoor unit returns to the standby power saving mode.

As described above, the outdoor unit 1 needs to be in the standby power saving mode that reduces the power consumption of the outdoor unit 1, but the outdoor unit 1 starts unintentionally due to the outside wind and results in having a shorter period for which the power consumption can be reduced. To solve such a problem, the present invention provides a control procedure described below with reference to an operational flow chart of FIG. 6.

Figure 6:
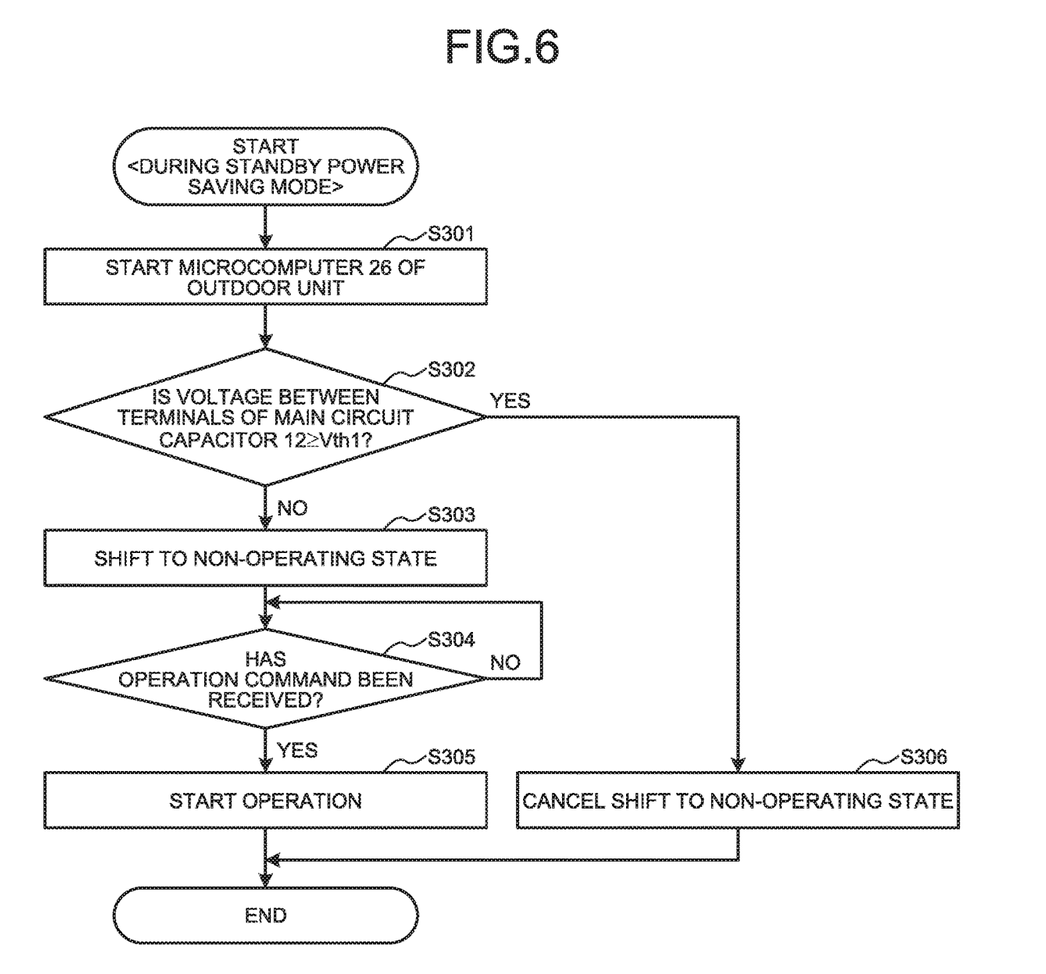
FIG. 6 is an operational flow chart or the air conditioner according to the first embodiment at the time of outside wind start.

When the microcomputer 26 of the outdoor unit 1 in the standby power saving mode starts (step S301), the start sequence can be thought as a start (hereinafter referred to as "normal start") resulting from closing the outdoor start relay 22 as described above, or an unintentional start of the outdoor unit 1 due to outside wind (hereinafter referred to as outside wind start). After starting, then, the microcomputer 26 first compares the voltage between the terminals of the main circuit capacitor 12 detected by the output voltage detection circuit 28 with a preset first threshold voltage (Vth1) (step S302).

If the comparison reveals that the voltage between the terminals of the main circuit capacitor 12 is lower than the first threshold voltage (Vth1) (No in step S302), it is determined that the normal start has occurred, whereby the initialization sequence at the time of the normal start is executed. Specifically, the relay 18 is closed by the control of the microcomputer 26. In the case of the normal start, the outdoor start relay 22 is closed, such that the smoothing capacitor 21 is charged by the power of the AC power supply 3 through the path defined by the outdoor start relay 22, the relay 23, the PTC thermistor 24, and the diode 20. Subsequently, the relay 18 is closed, such that the smoothing capacitor 21 is charged by the power of the AC power supply 3 also through the path defined by the relay 18, the resistance element 19, and the diode 20.

After that, the outdoor start relay 22 is opened by the indoor controller of the indoor unit 2. Also, the relay 23 is controlled by the microcomputer 26 of the outdoor unit 1 such that the relay 23 is opened. As a result, the smoothing capacitor 21 is charged only through the path via the relay 18. Note that the indoor controller of the outdoor unit 1 may open the outdoor start relay 22 after a lapse of a predetermined time since the outdoor start relay 22 is closed, or after the indoor controller receives a signal indicating the start of the microcomputer 26 from the microcomputer 26 via the communication line (not shown) between the outdoor unit 1 and the indoor unit 2.

Next, the relay 14 is controlled by the microcomputer 26, such that the relay 14 is closed. As a result, the main circuit capacitor 12 is charged by the power of the AC power supply 3 through a path defined by the PTC thermistor 13, the relay 14, and the backflow prevention diode 15. The microcomputer 26 monitors the voltage between the terminals of the main circuit capacitor 12 detected by the output voltage detection circuit 28 and, after confirming that the voltage between the terminals has reached a predetermined value or higher, closes the relay 5 and subsequently opens the relay 14. As a result, the main circuit capacitor 12 is charged through the path defined by the relay 5, the full-wave rectifier circuit 7, and the converter main circuit 8.

The execution of the initialization sequence described above allows the outdoor unit 1 to shift from the standby power saving mode to the non-operating state (step S303). After that, the outdoor unit 1 checks whether an operation command for an air conditioning operation such as heating, cooling, or fan operation has been received from the indoor unit. 2, using the communication line (not shown) connected between the outdoor unit. 1 and the indoor unit 2 (step S304). When having received the operation command for the air conditioning operation, the outdoor unit 1 starts the air conditioning operation according to the operation command (step S305).

Meanwhile, if the comparison reveals that the voltage between the terminals of the main circuit capacitor 12 immediately after the start of the microcomputer 26 is higher than or equal to the first threshold voltage (Vth1) (Yes in step S302), it is determined that the outside wind start has occurred. As a result, the process of shifting to the non-operating state stops without execution of the initialization sequence at the time of the normal start (step S306). That is, the shift of the relay 18 to the closed state through the control by the microcomputer 26, the shift of the outdoor start relay 22 to the opened state, the shift of the relay 23 to the opened state, the shift of the relay 14 to the closed state, the shift of the relay 5 to the closed state, and the subsequent shift of the relay 14 to the opened state do not occur. Therefore, the outdoor unit 1 maintains the open/closed states of the relays in the standby power saving mode illustrated in FIG. 1, and does not shift to the non-operating state illustrated in FIG. 2.

Effects of the control described above will be described. In the case of the normal start of the outdoor unit 1, no charging path to the main circuit capacitor 12 exists, because the relay 14 and the relay 5 are open immediately after the start of the microcomputer 26. Therefore, the main circuit capacitor 12 is not charged, and the voltage between the terminals of the main circuit capacitor 12 has not reached the voltage level necessary for the operation of the DC/DC converter circuit 25. In the case of the outside wind start of the outdoor unit 1, on the other hand, the regenerative current due to the electromotive force generated by the fan motor 30 flows through the main circuit capacitor 12, thereby charging the main circuit capacitor 12. Then, this charging causes the voltage between the terminals of the main circuit capacitor 12 to increase to the voltage level necessary for the operation of the DC/DC converter circuit 25. As a result, the DC/DC converter circuit 25 operates normally, such that the microcomputer 26 starts using the output voltage of the DC/DC converter circuit 25 as a power supply.

As discussed above, by checking the voltage between the terminals of the main circuit capacitor 12 immediately after the start of the microcomputer 26, it is possible to determine whether the start of the microcomputer 26 is the result of the normal start of the outdoor unit 1 or the outside wind start. Specifically, the microcomputer 26 determines that the outside wind start has occurred when the voltage between the terminals of the main circuit capacitor 12 is higher than or equal to the first threshold voltage (Vth1). The microcomputer 26 determines that the normal start has occurred when the voltage between the terminals of the main circuit capacitor 12 is lower than the first threshold voltage (Vth1). Note that, as an example, the first threshold voltage (Vth1) is set to the value of the voltage level necessary for the operation of the DC/DC converter circuit 25.

When it is determined that the outside wind start has occurred, the microcomputer 26 does not execute the initialization sequence including the opening/closing control of the relay. As a result, the outdoor unit 1 does not shift from the standby power saving mode to the non-operating state. It is thus possible to prevent an increase in power consumption due to starting of the outdoor unit 1 unintended by a user.

As described above, the air conditioner of the present embodiment checks the voltage between the terminals of the main circuit capacitor 12 immediately after the start of the microcomputer 26 of the outdoor unit 1 and determines whether the normal start or the outside wind start has occurred. When it is determined that the outside wind start has occurred, the outdoor unit 1 does not shift from the standby power saving mode to the non-operating state. As a result, power consumption due to unnecessary start of the outdoor unit 1 can be reduced.

Second Embodiment

Figure 7:
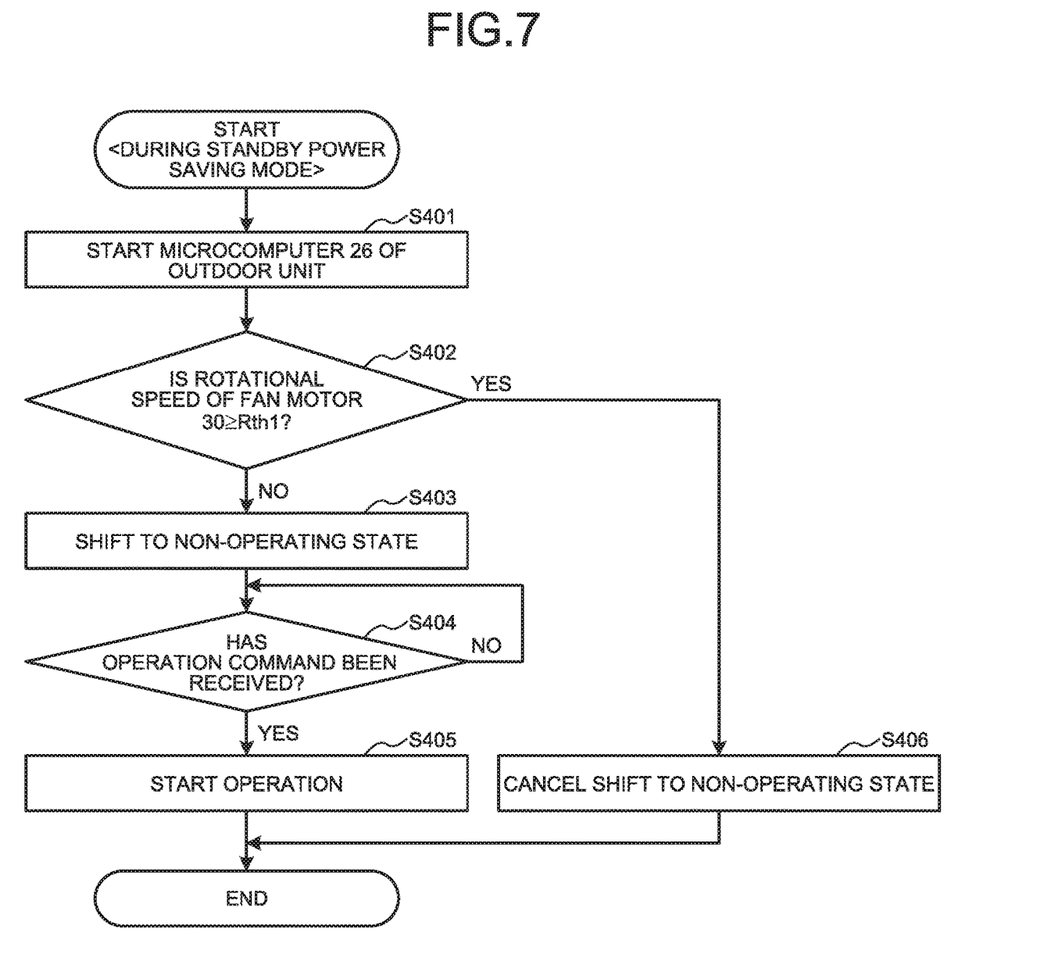
FIG. 7 is an operational flow chart of the air conditioner according to a second embodiment.

The Operation of the Air Conditioner According to a second embodiment will be described with reference to an operational flow chart of FIG. 7. Note that steps S401 and S403 to S406 in the operational flow chart of FIG. 7 will not be described as they are the same processing as steps S301 and S303 to S306 in FIG. 6 of the first embodiment, whereby processing in step S402 will mainly be described.

After the microcomputer 26 of the outdoor unit 1 starts (step S401), first, the rotational speed of the fan motor 30 detected by the rotational speed detection circuit 32 is compared with a preset first threshold rotational speed (Rth1) (step S402). If the comparison reveals that the rotational speed of the fan motor 30 is lower than the first threshold rotational speed (Rth1) (No in step S402), it is determined that the normal start has occurred, such that the initialization sequence at the time of the normal start is executed to thereby shift from the standby power saving mode to the non-operating state (step S403). Subsequent operations are the same as those in the first embodiment. Note that the first threshold rotational speed (Rth1) may be selected after the rotational speed at which the electromotive force generated by the fan motor 30 is at the voltage level necessary for the operation of the DC/DC converter circuit 25 is known from an experiment or a simulation.

On the other hand, if the comparison reveals that the rotational speed of the fan motor 30 immediately after the start of the microcomputer 26 is higher than or equal to the first threshold rotational speed (Rth1) (Yes in step S402), it is determined that the outside wind start has occurred so that the initialization sequence at the time of the normal start is not executed. As a result, the process of shifting from the standby power saving mode to the non-operating state is canceled (step S406).

Effects of the control described above will be described. In the case of the start of the outdoor unit 1 caused by the outside wind start, the rotational speed of the fan motor 30 detected by the rotational speed detection circuit 32 is a non-zero value because the fan motor 30 is being rotated by the outside wind. In the case of the start of the outdoor unit 1 caused by the normal start, on the other hand, it is highly likely that no outside wind is blowing around the outdoor unit 1, or the outside wind is too weak to cause the outside wind start. In view of these circumstances, the rotational speed of the fan motor 30 detected by the rotational speed detection circuit 32 is compared with the preset first threshold rotational speed (Rth1), and, if the rotational speed of the fan motor 30 is higher than or equal to the first threshold rotational speed. (Rth1), it is determined that the outside wind start has occurred. As a result, the outdoor unit 1 does not shift to the non-operating state in the case of the outside wind start. It is thus possible to prevent an increase in power consumption due to the start of the outdoor unit 1 unintended by a user.

According to the above description, the determination of whether the outside wind start or the normal start has occurred is made only by the rotational speed of the fan motor 30, but the duration of the rotation of the fan motor 30 may also be used to determine whether the outside wind start or the normal start has occurred. For example, by calculating a sum of products of the rotational speed detected by the rotational speed detection circuit 32 and the duration at the rotational speed, it is possible to more accurately determine the voltage between the terminals of the main circuit capacitor 12. As a result, it can be determined whether the outside wind start or the normal start has occurred even when the strength of the outside wind varies with time.

Moreover, both the method using the voltage between the terminals of the main circuit capacitor 12 as described in the first embodiment and the method using the rotational speed of the fan motor 30 as described in the present embodiment may be performed, in which case the process of shifting to the non-operating state may be canceled only when each of the two methods determines that the outside wind start has occurred. As a result, it can be determined more accurately whether the outside wind start or the normal start has occurred.

Third Embodiment

In the first and second embodiments, when the start of the outdoor unit 1 is caused by the outside wind start, the initialization sequence at the time of the normal start is not executed, and the process of shifting from the standby power saving mode to the non-operating state is canceled. Although the power consumption of the outdoor unit can be reduced by not shifting to the non-operating state, the main circuit capacitor 12 continues to be charged by the regenerative current generated by the electromotive force of the fan motor 30 if the outside wind around the outdoor unit 1 is very strong or blows for a long duration after the cancellation of the shift to the non-operating state. When power exceeding the power consumed by the circuit elements in the outdoor unit 1 such as the microcomputer 26 is supplied as regenerative power due to the electromotive force of the fan motor 30, the voltage between the terminals of the main circuit capacitor 12 further increases. If the voltage between the terminals of the main circuit capacitor 12 exceeds the withstand voltage of peripheral components such as the main circuit capacitor 12 and the inverter main circuit 16, these peripheral components are likely to fail. Accordingly, the present embodiment performs control such that the voltage between the terminals of the main circuit capacitor 12 at the time of the outside wind start does not exceed predetermined value.

Figure 8:
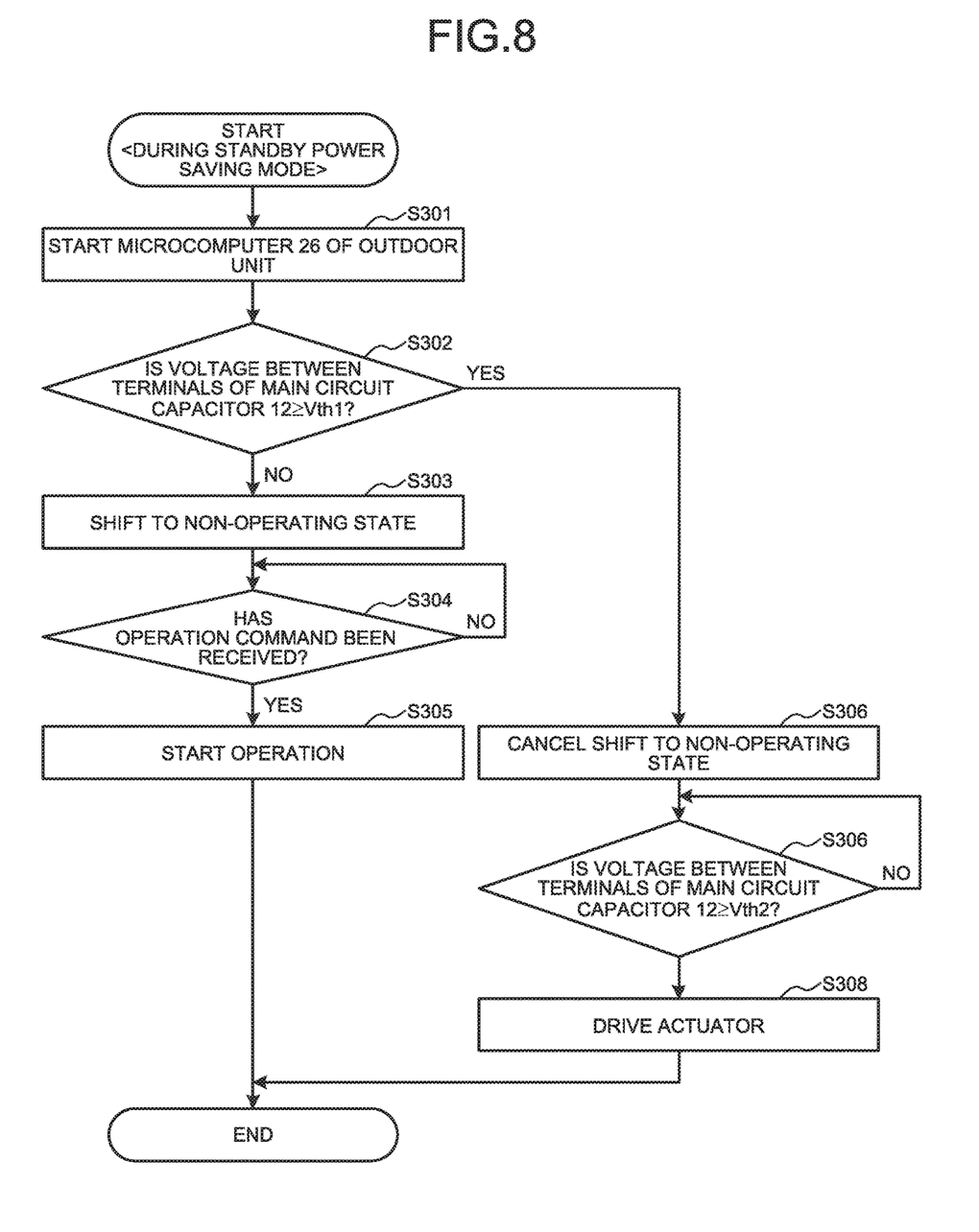
FIG. 8 is an operational flow chart of the air conditioner according to a third embodiment.

The operation of the air conditioner according to a third embodiment will be described with reference to an operational flow chart of FIG. 8. Note that steps S301 to S306 in the operational flow chart of FIG. 8 will not be described as they are the same processing as steps S301 to S306 in FIG. 6 of the first embodiment, whereby processing in steps S307 and S308 will mainly be described.

After determining that the start of the outdoor unit 1 is caused by the outside wind start and canceling the process of shifting from the standby power saving mode to the non-operating state (step S306), the microcomputer 26 checks whether or not the voltage between the terminals of the main circuit capacitor 12 is higher than or equal to a second threshold voltage (Vth2) (step S307). Here, the second threshold voltage (Vth2) is a preset threshold voltage higher than the first threshold voltage (Vth1) and may be set to, for example, a value smaller than the minimum withstand voltage of the electronic components used in the outdoor unit 1.

If the voltage between the terminals of the main circuit capacitor 12 is lower than the second threshold voltage (Vth2) (No in step S307), the processing of step S307 is repeated. If the voltage between the terminals of the main circuit capacitor 12 is higher than or equal to the second threshold voltage (Vth2) (Yes in step S307), actuator drive circuits implemented in the outdoor unit 1 such as the four-way valve drive circuit 35 for driving the four-way valve 33 and the electronic expansion valve drive circuit 36 for driving the electronic expansion valve 34 are operated to thereby drive these actuators (step S308). As a result, the power consumption in the outdoor unit 1 increases, thereby reducing the amount of electric charge stored in the main circuit capacitor 12. This can prevent the voltage between terminals of the main circuit capacitor 12 from becoming higher than the withstand voltage of the electronic components used in the outdoor unit 1. Note that the actuators may be driven to an extent that does not hinder the overall operation of the outdoor unit 1. For example, if variation in a degree of the stop opening of the electronic expansion valve 34 is inconvenience, energization may be made to such an extent that the opening of the electronic expansion valve 34 does not vary.

Although the power consumption can be maximized by driving all the actuators that can be driven, the type and number of actuators to be driven may be determined in advance, and information on the type and number of actuators to be driven may be held in a storage unit in the microcomputer 26. Alternatively, the information on the type and number of actuators may be held in an external storage unit (not shown) such as a ROM, and the microcomputer 26 may obtain the information in the external storage unit.

Moreover, the type and number of actuators to be driven may be changed in accordance with a change in the voltage between the terminals of the main circuit capacitor 12. For example, a plurality of the second threshold voltages (such as Vth2A<Vth2B<Vth2C) may be provided for the voltage between the terminals of the main circuit capacitor 12, in which case the actuator to be driven may be changed stepwise in accordance with the voltage level of the voltage between the terminals of the main circuit capacitor 12. For example, the four-way valve drive circuit 35 may be driven when the voltage between the terminals of the main circuit capacitor 12 is Vth2A or higher and lower than Vth2B. The electronic expansion valve drive circuit 36 may also be driven when the voltage between the terminals is Vth2B or higher and lower than Vth2C. The compressor motor 17 may also be energized to perform constraint energization when the voltage between the terminals is Vth2C or higher. Note that the constraint energization refers to energization control for preheating the compressor as the compressor motor 17 stops rotating with the winding of the motor 17 energized through a switching operation on the motor 17 to such an extent as not to rotate the motor 17.

After the actuators are driven in step S308, the charging of the main circuit capacitor 12 stops when the outside wind stops, such that the voltage between the terminals of the main circuit capacitor 12 gradually decreases. When the voltage between the terminals further decreases to a level at which the DC/DC converter circuit 25 stops operating, the microcomputer 26 also stops operating so that the outdoor unit 1 shifts to the standby power saving mode.

Note that after the actuators are driven in step S308, the actuators may stop being driven at the point when the voltage between the terminals of the main circuit capacitor 12 becomes equal to or lower than a predetermined voltage. Since such an appropriate procedure can stop the drive of the actuators, it is possible to prevent damage to the actuators.

As described above, in the air conditioner of the present embodiment, the actuator of the outdoor unit 1 is driven when the voltage between the terminals of the main circuit capacitor 12 becomes equal to or higher than the second threshold voltage (Vth2) at the time of the outside wind start. As a result, the voltage between the terminals of the main circuit capacitor 12 can be controlled so as not to exceed a predetermined value. This can avoid failure of the electronic components such as the main circuit capacitor 12.

Fourth Embodiment

In the third embodiment, when the start of the outdoor unit 1 is caused by the outside wind start, the actuator included in the outdoor unit 1 is driven to increase the power consumption and decrease the voltage between the terminals of the main circuit capacitor 12, such that the outdoor unit 1 shifts to the standby power saving mode. Assuming that the compressor motor 17, which is selected as the actuator to be driven, is subjected to the constraint energization, high power consumption by the constraint energization may decrease the voltage between the terminals of main circuit capacitor 12 to a level at which the DC/DC converter circuit. 25 stops operating despite the outside wind still blowing, in which case the outdoor unit 1 may shift to the standby power saving mode. If that is the case, the main circuit capacitor 12 is charged immediately after the shift to the standby power saving mode, such that the outdoor unit 1 undergoes the outside wind start. After the outside wind start, the process from step S301 illustrated in FIG. 8 is repeated. Thus, during the period of time over which the motor 17 continues to be rotated by the outside wind, the outside wind start or the outdoor unit 1 and the shift to the standby power saving mode are repeated many times. As a result, the main circuit capacitor 12 is repeatedly charged and discharged to possibly result in a shorter capacitor life, which is not preferable in terms of the product life. Therefore, in the present embodiment, the outdoor unit 1 is designed not to shift to the standby power saving mode during the period of time over which the motor 17 continues to be rotated by the outside wind after the actuator is driven at the time of the outside wind start.

Figure 9:
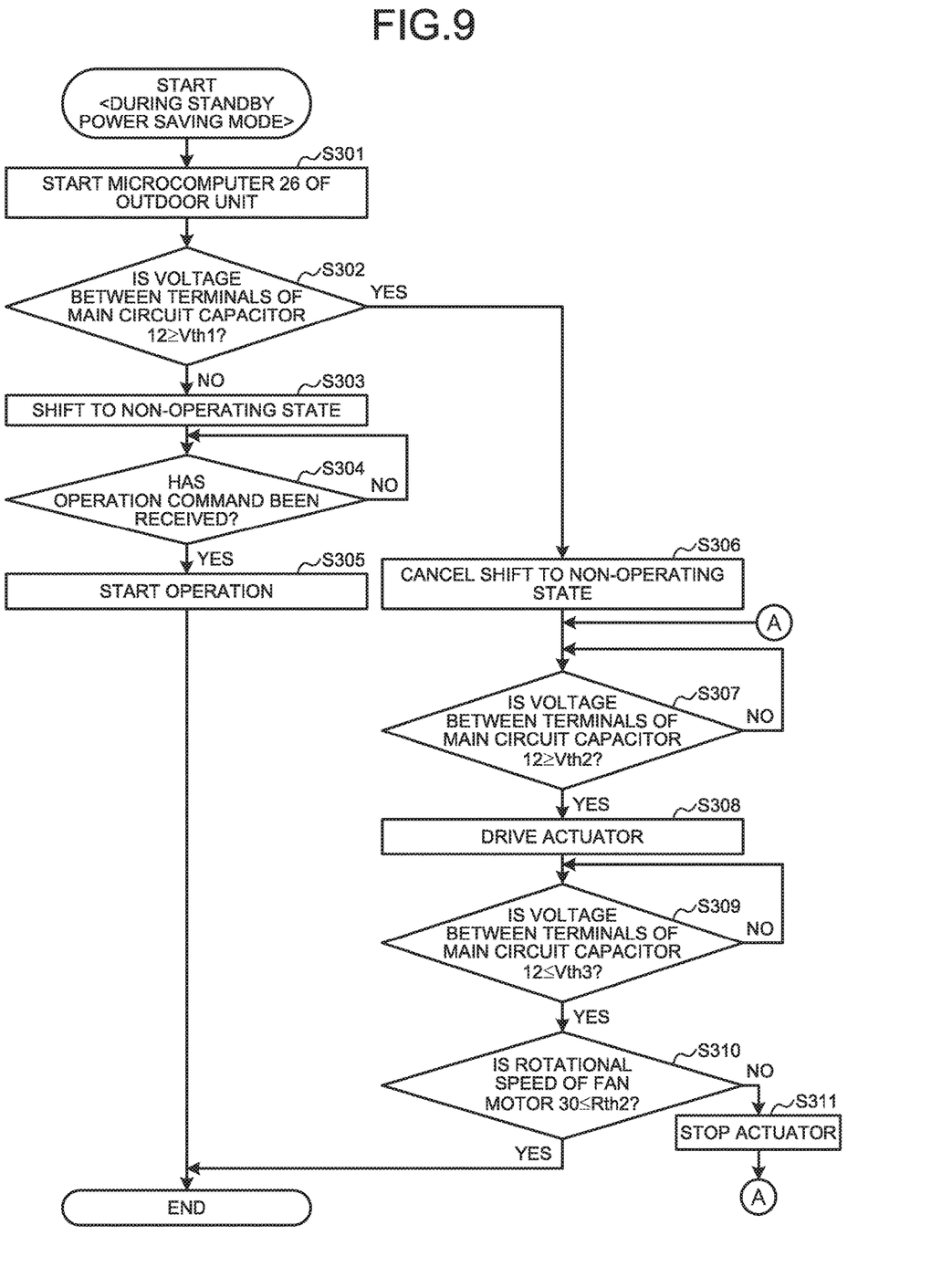
FIG. 9 is an operational flow chart of the air conditioner according to a fourth embodiment.

The operation of the air conditioner according to a fourth embodiment will be described with reference to an operational flow chart of FIG. 9. Note that steps S301 to S308 in the operational flow chart of FIG. 9 will not be described as they are the same processing as steps S301 to S308 in FIG. 8 of the third embodiment, whereby processing in steps S309 to S311 will mainly be described.

After the actuator starts to be driven in step S308, the voltage between the terminals of the main circuit capacitor 12 detected by the output voltage detection circuit 28 is compared with a preset third threshold voltage (Vth3) (step S309). Here, the third threshold voltage (Vth3) is a preset threshold voltage that is higher than the first threshold voltage (Vth1) and lower than the second threshold voltage (Vth2) (i.e., Vth2>Vth3>Vth1). As an example, the third threshold voltage (Vth3) may be set to √2 times the root mean square value of the AC power supply 3.

If the comparison reveals that the voltage between the terminals of the main circuit capacitor 12 is higher than the third threshold voltage (Vth3) (No in step S309), the voltage between the terminals of the main circuit capacitor 12 continues to be monitored. If the voltage between the terminals of the main circuit capacitor 12 is lower than or equal to the third threshold voltage (Vth3) (Yes in step S309), the rotational speed of the fan motor 30 detected by the rotational speed detection circuit 32 is compared with a preset second threshold rotational speed (Rth2) (step S310). Here, the second threshold rotational speed (Rth2) is a preset threshold rotational speed lower than the first threshold rotational speed (Rth1).

If the comparison reveals that the rotational speed of the fan motor 30 is lower than or equal to the second threshold rotational speed (Rth2) (Yes in step S310), it is determined that the outside wind has stopped. After that, with the outside wind having stopped, the charging of the main circuit capacitor 12 stops, such that the voltage between the terminals of the main circuit capacitor 12 gradually decreases. Then, when the voltage between the terminals decreases to a level at which the DC/DC converter circuit 25 stops operating, the microcomputer 26 also stops operating, such that the outdoor unit 1 shifts to the standby power saving mode.

On the other hand, if the rotational speed of the fan motor 30 is higher than the second threshold rotational speed. (Rth2) (No in step S310), it is determined that the outside wind has not stopped. Then, some or all of the actuators that have started to be driven in step S308 stop being driven (step S311). The processing thereafter returns to step S307 and repeats steps S307 to S311.

Note that the type of the actuator to stop or the number of the actuators to stop in the processing of step S311 may be changed in accordance with the magnitude of the voltage between the terminals of the main circuit capacitor 12 such that the power consumption resulting from driving the actuator may be adjusted. Adjusting the power consumption resulting from driving the actuator prevents the voltage between the terminals of the main circuit capacitor 12 from transitioning abruptly from a voltage value lower than the third threshold voltage (Vth3) to a voltage value higher than the second threshold voltage (Vth2), with the result that the number of times the main circuit capacitor 12 is charged and discharged can be reduced.

Moreover, the actuator whose power consumption that is higher than a predetermined value does not need to be driven at step 308. This can reduce the frequency of occurrence of a state where the voltage between the terminals of the main circuit capacitor 12 becomes lower than or equal to the third threshold voltage (Vth3) due to the drive of the actuator. An example of the actuator with high power consumption is the compressor motor 17, and thus the compressor motor 17 does not need to be subjected to constraint energization.

As described above, in the air conditioner of the present embodiment, the actuator starts at the time of the outside wind start, but thereafter stops being driven when the voltage between the terminals of the main circuit capacitor 12 is lower than or equal to the third threshold voltage (Vth3), and at the same time the rotational speed of the fan motor 30 is higher than the preset second threshold rotational speed (Rth2) that is lower than the first threshold rotational speed (Rth1). As a result, the phenomenon of repeating the outside wind start and the shift to the standby power saving mode many times can be avoided to thereby prevent deterioration of electronic components such as deterioration in the life of the main circuit capacitor 12.

REFERENCE SIGNS LIST 1 outdoor unit; 2 indoor unit; 3 AC power supply; 4 noise filter; 5 relay; 6 capacitor; 7 full-wave rectifier circuit (SB); 8 converter main circuit; 9 reactor; 10 switching element; 11 backflow prevention diode; 12 main circuit capacitor; 13 PTC thermistor; 14 relay; 15 backflow prevention diode; 16 inverter main circuit; 17 compressor motor; 18 relay; 19 resistance element; 20 diode; 21 smoothing capacitor; 22 outdoor start relay; 23 relay; 24 PTC thermistor; 25 DC/DC converter circuit; 26 microcomputer; 27 diode; 28 output voltage detection circuit; 29 outdoor fan; 30 fan motor; 31 rotational speed instruction output circuit; 32 rotational speed detection circuit; 33 four-way valve; 34 electronic expansion valve; 35 four-way valve drive circuit; 36 electronic expansion valve drive circuit.

The invention claimed is:

1. An air conditioner including an outdoor unit and an indoor unit, the outdoor unit comprising:
a converter main circuit to rectify and smooth an AC voltage of an AC power supply, and allow a DC voltage to be generated across a main circuit capacitor;
an inverter main circuit to convert the DC voltage generated by the main circuit capacitor into an AC voltage;
a compressor motor to be driven by the inverter main circuit;
an outdoor fan;
a fan motor to receive a supply of the DC voltage generated across the main circuit capacitor and rotationally drive the outdoor fan; and
a controller to receive a supply of the DC voltage generated across the main circuit capacitor and control the converter main circuit, the inverter main circuit, and the fan motor,
wherein when the fan motor rotates due to outside wind hitting the outdoor fan and enters a power generating state during a standby power saving mode of the outdoor unit, the controller maintains the outdoor unit in the standby power saving mode without allowing the outdoor unit to shift to a non-operating state,
wherein the air conditioner further comprises a rotational speed detection circuit to detect a rotational speed of the fan motor, the controller preventing the outdoor unit from shifting to the non-operating state from the standby power saving mode when the rotational speed detected by the rotational speed detection circuit is higher than or equal to a preset first threshold rotational speed, and
wherein after the controller prevents the outdoor unit from shifting to the non-operating state from the standby power saving mode, the controller drives an actuator included in the outdoor unit when a voltage detected by an output voltage detection circuit, which detects a voltage between terminals of the main circuit capacitor, is higher than or equal to a preset second threshold voltage that is higher than a first threshold voltage.

2. The air conditioner according to claim 1, wherein
after the controller drives the actuator included in the outdoor unit, the controller stops the drive of the actuator when
the voltage detected by the output voltage detection circuit is lower than or equal to a preset third threshold voltage and
the rotational speed detected by the rotational speed detection circuit is higher than a preset second threshold rotational speed,
the preset third threshold voltage being higher than the first threshold voltage and lower than the second threshold voltage,
the preset second threshold rotational speed being lower than a first threshold rotational speed for detecting the power generating state caused by the rotation of the fan motor.

3. The air conditioner according to claim 1, further comprising
a switch to switch between a supply state to supply the AC voltage of the AC power supply to the converter main circuit and a cut-off state to cut off a supply of the AC voltage of the AC power to the converter main circuit, wherein
the switch is in the supply state when the outdoor unit is in the non-operating state, and
the switch is in the cut-off state when the outdoor unit is in the standby power saving mode.

4. The air conditioner according to claim 3, wherein
after the controller drives the actuator included in the outdoor unit, the controller stops the drive of the actuator when
the voltage detected by the output voltage detection circuit is lower than or equal to a preset third threshold voltage and
the rotational speed detected by the rotational speed detection circuit is higher than a preset second threshold rotational speed,
the preset third threshold voltage being higher than the first threshold voltage and lower than the second threshold voltage,
the preset second threshold rotational speed being lower than a first threshold rotational speed for detecting the power generating state caused by the rotation of the fan motor.

5. An air conditioner including an outdoor unit and an indoor unit, the outdoor unit comprising:
a converter main circuit to rectify and smooth an AC voltage of an AC power supply, and allow a DC voltage to be generated across a main circuit capacitor;
an inverter main circuit to convert the DC voltage generated by the main circuit capacitor into an AC voltage;
a compressor motor to be driven by the inverter main circuit;
an outdoor fan;
a fan motor to receive a supply of the DC voltage generated across the main circuit capacitor and rotationally drive the outdoor fan; and
a controller to receive a supply of the DC voltage generated across the main circuit capacitor and control the converter main circuit, the inverter main circuit, and the fan motor,
wherein when the fan motor rotates due to outside wind hitting the outdoor fan and enters a power generating state during a standby power saving mode of the outdoor unit, the controller maintains the outdoor unit in the standby power saving mode without allowing the outdoor unit to shift to a non-operating state wherein the air conditioner further comprises a switch to switch between a supply state to supply the AC voltage of the AC power supply to the converter main circuit and a cut-off state to cut off a supply of the AC voltage of the AC power to the converter main circuit, wherein the switch is in the supply state when the outdoor unit is in the non-operating state, and wherein the switch is in the cut-off state when the outdoor unit is in the standby power saving mode.

6. The air conditioner according to claim 5, further comprising an output voltage detection circuit to detect a voltage between terminals of the main circuit capacitor, wherein the controller prevents the outdoor unit from shifting to the non-operating state from the standby power saving mode when the voltage detected by the output voltage detection circuit is higher than or equal to a preset first threshold voltage.

7. The air conditioner according to claim 5, further comprising a rotational speed detection circuit to detect a rotational speed of the fan motor, wherein the controller prevents the outdoor unit from shifting to the non-operating state from the standby power saving mode when the rotational speed detected by the rotational speed detection circuit is higher than or equal to a preset first threshold rotational speed.

8. The air conditioner according to claim 6, wherein after the controller prevents the outdoor unit from shifting to the non-operating state from the standby power saving mode, the controller drives an actuator included in the outdoor unit when the voltage detected by the output voltage detection circuit is higher than or equal to a preset second threshold voltage that is higher than the first threshold voltage.

9. The air conditioner according to claim 8, further comprising a rotational speed detection circuit to detect a rotational speed of the fan motor, wherein after the controller drives the actuator included in the outdoor unit, the controller stops the drive of the actuator when the voltage detected by the output voltage detection circuit is lower than or equal to a preset third threshold voltage and the rotational speed detected by the rotational speed detection circuit is higher than a preset second threshold rotational speed, the preset third threshold voltage being higher than the first threshold voltage and lower than the second threshold voltage, the preset second threshold rotational speed being lower than a first threshold rotational speed for detecting the power generating state caused by the rotation of the fan motor.

\* \* \* \* \*